Figure 1:
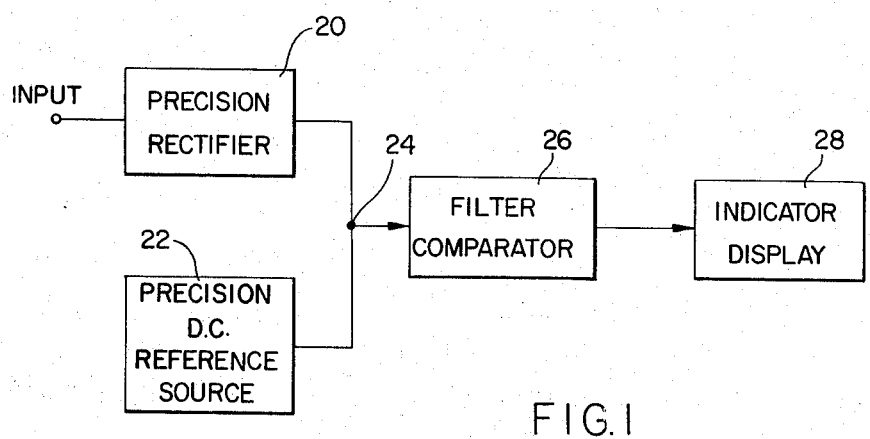

March 28, 1967   P. L. RICHMAN   3,311,835
OPERATIONAL RECTIFIER
Filed March 22, 1963

INVENTOR.
PETER L. RICHMAN
BY Rosen & Schiller
ATTORNEYS

United States Patent Office 3,311,835
Patented Mar. 28, 1967

3,311,835
OPERATIONAL RECTIFIER
Peter L. Richman, Lexington, Mass., assignor, by mesne assignments, to Weston Instruments Inc., Newark, N.J., a corporation of Texas
Filed Mar. 22, 1963, Ser. No. 267,206
6 Claims. (Cl. 328—146)

This invention relates to electronic instrumentation, and more particularly to electronic devices for comparing or monitoring an A.C. signal with respect to a predetermined D.C. reference voltage.

It is known that an A.C. signal can be monitored by comparing it continuously with a D.C. signal of fixed predetermined amplitude. Any instability of the A.C. signal can then be immediately detected as a variation in the difference between the two. In certain instances, such as in the monitoring of the voltage level of gyroscope drive input A.C. voltages, it is desirable to provide such monitoring at levels of very high precision and stability.

Monitoring can be accomplished by comparing the average A.C. value with the D.C. reference, as by rectifying the A.C. signal and summing the rectified A.C. with the D.C. reference in order to provide a D.C. error signal. The latter is then a function of the average value of the A.C. signal, and will vary substantially linearily with changes in the average A.C. value. A known means for rectifying the A.C. signal is an "operational rectifier" which comprises a high, or effectively infinite, open-loop gain amplifier preferably having a pair of degenerative feedback loops, each of which includes a rectifying element such as a diode. The diodes are poled so that each loop provides degenerative feedback for a corresponding polarity of the A.C. waveform. Such operational rectifiers are then relatively independent of characteristics of ordinary diode rectifiers, such as drift. Inasmuch as the stability of operational rectifiers are dependent only upon the resistors and amplifier gain to a very good first or second order of approximation, they are particularly well suited for precision monitoring.

However, the ultimate monitoring precision of such operational rectifiers is limited by the back leakage of the diodes. Also, in using operational rectifiers as input devices to comparators, the nature of the load imposed on the rectifier output by the comparator has a distinct effect on the stability and thus the precision of the comparison. For example, if the load is reactive, the precision of the comparison will be subject to error due to any frequency change in the input A.C.

The principal object of the present invention is therefore to provide an improved, high precision, A.C. voltage monitoring device.

Other objects of the present invention are to provide an improved, high precision, operational rectifier circuit having minimized diode leakage and therefore being particularly adapted for use with such monitoring device; to provide an A.C. voltage monitoring device comprising such an operational rectifier and filter-comparator means for comparing the output of the operational rectifier with a precision D.C. reference voltage, which filter-comparator imposes substantially no reactive load on the operational rectifier output; to provide an operational rectifier comprising a high gain amplification stage having at least one degenerative, resistive feedback loop around such stage, which loop includes a series pair of diodes, and means for resistively coupling the junction of the diodes to ground; and to provide a high precision, A.C. voltage monitoring device which comprises an operational rectifier of the type described, and a filter-comparator comprising a high gain amplifier having its input resistively coupled at a summing junction to the output of the operational rectifier and adapted to be resistively coupled at the summing junction to a high precision D.C. voltage reference source, such high gain amplifier having a degenerative loop between its output and the summing junction at its input, the last-named feedback loop preferably comprising a filtering circuit, such as one having resistive and capacitive impedances in parallel.

Figure 2:
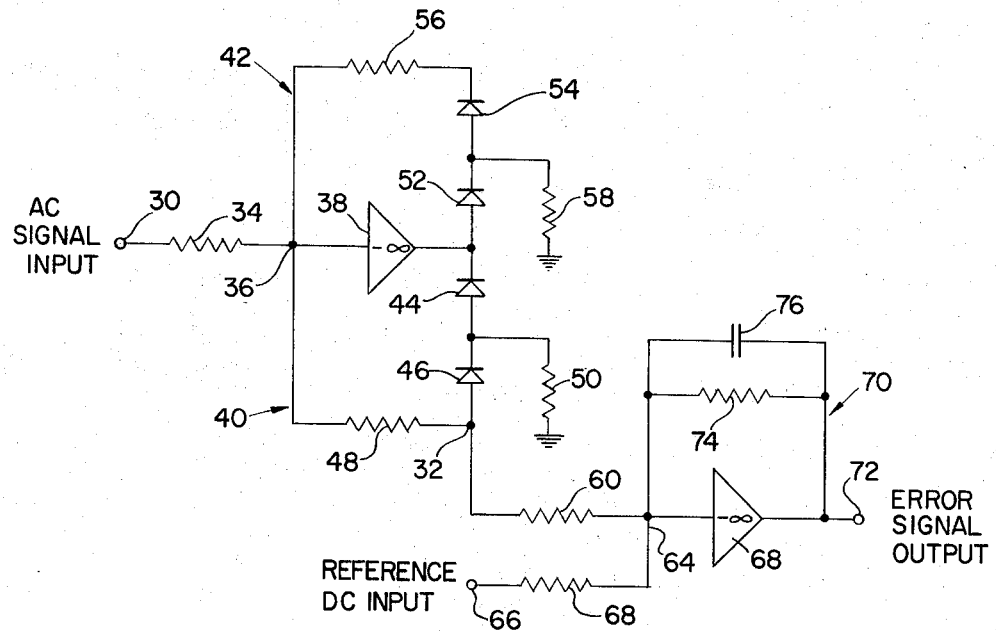

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

FIG. 1 is a block diagram illustrating the general form of the present invention; and FIG. 2 is a schematic circuit diagram of one embodiment of the principles of the present invention.

Referring now to FIG. 1, the basic elements forming the present invention include precision rectifying means 20 having an input at which the A.C. voltage signal to be monitored is intended to be applied. There is also shown a precision D.C. reference voltage source 22, which, per se, forms no part of the present invention and is well known in the art. For instance, the D.C. reference source may be a known, high-precision, oven-controlled, Zener reference source, or a standard electrochemical cell, or the like. The outputs of the precision rectifying means and the D.C. reference sources are summed, as at junction 24, and the summed voltages fed to the input of filter-comparator means 26. Of course, if the polarity of the D.C. reference source voltage is selected to be opposite to that of the voltage output of the precision rectifying means, the summation of the two will provide a difference or error signal. Filter-comparator 26, being preferably of the operational amplifier type, therefore is intended, in operation, to present a virtual ground at its input and thus imposes substantially only a purely resistive load on both rectifying means 20 and D.C. reference source 22. The output of the filter-comparator may then be fed to an indicator display device, such as 28, wherein the error signal can be made apparent. Indicator-display device 28, per se, forms no part of the present invention and, being well known to the art, may assume any of many forms. For instance, the indicator-display device may be a strip-chart recorder, cathode ray oscilloscope, galvanometer, or the like.

It will be apparent that if the magnitude of the voltage from the D.C. reference source is exactly equal and opposite to the amplitude of the rectifying means output, the output of the filter-comparator will be zero. Any deviation in the A.C. signal which results in a perturbation in this balance will forthwith be apparent at the indicator-display device.

Referring now to FIG. 2, there will be seen a preferred embodiment illustrating the circuitry of the invention. Precision rectifier 20 comprises a network having an input terminal 30, at which it is intended to connect the A.C. voltage signal to be monitored, and an output terminal 32, at which a precision rectified component of the A.C. voltage is intended to appear. Terminal 30 is directly coupled through precision series input resistor 34 to summing junction 36 at the input of high gain (e.g. in the order of a factor of 1000 or more) inverting amplifier 38. Rectifier 20 also includes a pair of feedback loops 40 and 42 around amplifier 38, joining the output of amplifier 38 with summing junction 36. Loop 40 comprises, in series between the output of amplifier 38 and summing junction 36, a pair of conventional unidirectionally conductive diodes 44 and 46 and feedback resistor 48. The cathode of one diode is connected to the anode of the other so that a normally conductive current path along loop 40 exists substantially in only one direction. In the form shown, where output terminal 32 is connected in loop 40 as between the feedback resistor and the diode adjacent thereto, resistor 48 is also preferably a high precision resistance. Where overall multiple gain is not particularly desired, the overall gain can be set at unity by matching the ohmic values of resistors 48 and 34. Where overall gain is desired, the ratio of resistors 48 and 34 can be appropriately adjusted as is well known. The anode-cathode junction between diodes 34 and 46 is connected to ground through resistor 50.

Loop 42 similarly comprises in series, between the output of amplifier 38 and summing junction 36, a pair of diodes 52 and 54 and feedback resistor 56. The cathode of one of diodes 52 and 54 is connected to the anode of the other, and the diodes are so poled as to provide a feedback path in loop 42 for current of polarity opposite to that allowed to flow in loop 40. The anode-cathode junction between diodes 52 and 54 is also connected to ground through resistor 58.

While the invention will function with only loop 40 around amplifier 38, it is preferred to also employ loop 42 through resistor 58, to insure linearly stable operation for amplifier 38 by providing symmetry with loop 40, which will tend to equalize the effect of transients. However, because no output voltage is taken, in the form shown, at loop 42, the nature of resistor 56 is not critical. Indeed, resistor 56 can be selected to be any value between a dead short and at least the general magnitude of resistor 34, but is preferably the same value as the latter.

In operation, when an A.C. signal is applied to terminal 30, because a feedback path, which is degenerative due to the inversion provided by amplifier 38, exists in loop 40 for one polarity of the input required and in loop 42 for the opposite polarity, the input voltage will be related to the output voltage according only to the ratio of the values of feedback resistor to input resistor.

In any event, the operational rectifier will tend to have its input at summing junction 36 at zero, i.e. a virtual ground. Now, assuming the instantaneous polarity of the output of amplifier 38 is that which reverse biases diodes 52 and 54, diodes 44 and 46 will be then in conduction and feedback is along loop 40. Any back-leakage through reverse-biased diodes 52 and 54 can materially affect the precision with which the voltage at terminal 32 is related to the value of the input A.C. voltage. For example, if a small current leakage, e.g. 0.5 microampere, appears in the diodes of loop 42, and the diodes are ungrounded, the operational rectifier will then tend to adjust the feedback through loop 40 to compensate for this leakage effect, giving an output at terminal 32 which is distorted from the true value.

The coupling of the diode junction to ground through a resistor for each loop reduces the effect of back leakage to negligible values. For example, assuming typical values where the input voltage $E_i = 10$ v. R.M.S., resistor $34 = 10K\ \Omega$, the gain of amplifier $38 = 10,000$, and resistors 50 and $58 = 20K\ \Omega$ each, if the 0.5 microampere back-leakage appears in diode 52, then 10 millivolts will develop between the two diodes due to the current flowing through resistor 58 between the diode junction and ground. Effectively, then, the back-bias on diode 54 has been reduced to a value several orders of magnitude less than the voltage back-biasing diode 52. This considerably lowered back-bias insures negligible leakage through diode 54, and thus drastically reduces errors due to current leakage around loop 42 during feedback through loop 40. This insures high precision rectification whereby the half-wave rectified voltage at output terminal 32, very accurately represents the value of the A.C. input signal. Hence, an improved operational rectifier of the type described is of particular use in a precision comparator device.

The invention also includes means for comparing the half-wave rectified A.C. voltage with a precision D.C. voltage. In the form shown, filter-comparator 26 which serves this function, is an adder type of operational amplifier which includes a pair of input resistors 60 and 62, preferably of equal value. Resistor 60 is connected in series between output terminal 32 and summing junction 64, resistor 62 being connected in series between terminal 66 (adapted for connection to a precision D.C. voltage source) and summing junction 64. Thus the two resistors are in parallel. Junction 64 forms the input terminal of another high-gain, inverting amplifier 68. The output of amplifier 68, as at terminal 72, is coupled through feedback loop 70 to summing junction 64. In this instance, the feedback loop is formed of a resistance such as resistor 74, and a capacitance, such as capacitor 76 in parallel with one another. Other feedback resistor-capacitor combinations to provide filtering are also acceptable as is a combination of a simple resistive feedback loop with a subsequent filtering stage at the comparator output.

In operation, it is intended that the half-wave rectified output of precision operational rectifier 20 appears at terminal 32 and a precision D.C. reference voltage is applied at terminal 66. The two voltages are added at summing junction 60, and where their polarities are opposite, the result is to provide a difference signal at the input of amplifier 68. It will be apparent to those skilled in the art that because amplifier 68 inverts the signal, and due to the nature of feedback loop 70, the feedback will tend to bring the voltage at summing junction 64 to zero while acting as a filter to smooth the rectified ripple of the output from operational rectifier 20. Of course, resistor 74 is also preferably a precision resistor having a value which can be arbitrarily selected with respect to the value of junction resistor 60 so that the overall gain is any desired proportion. Because junction 64 is a virtual ground, the series impedance seen by the operational rectifier is passive and resistive, i.e., resistor 60, thereby contributing to the precision of the comparison in terms of stability under variations in the nature of the original A.C. input signal. At low frequencies of input A.C., full wave rectification might be more desirable than the half-wave rectification described. In such event, as is known to those skilled in the art, the embodiment of FIG. 2 can be readily modified to provide the requisite full-wave input to filter-comparator 26. For example, a connection between terminal 30 and summing junction 64 through an appropriately scaled resistance will provide full-wave rectified output. Similarly, one can accomplish the same result by connecting junction 64 to a point in loop 42 (between resistor 56 and diode 54) through an inverter and input resistor.

Since certain changes may be made in the above apparatus without departing from the scope of the invention herein involved it is intended that all matter contained in the above description or shown in the accompanying drawings shall be interpreted in an illustrative and not in a limiting sense.

What is claimed is:

1. A device for monitoring an A.C. voltage signal, said device comprising in combination, operational rectifier means for converting said A.C. voltage to a D.C. voltage, and a comparator means for comparing said D.C. voltage with a precision D.C. reference voltage, said operational rectifier means comprising a high gain amplifier having a degenerative feedback loop including in series a pair of unidirectionally conductive devices poled in the same direction and a resistance between the output and input of said amplifier, means resistively connecting the junction of said unidirectionally conductive devices to ground, and means for coupling the input of said comparator means to a point in said feedback loop between said resistance and said unidirectionally conductive devices.

2. A device for monitoring an A.C. voltage signal, said device comprising in combination, operational rectifier means for converting said A.C. voltage to a D.C. voltage and comparator means for comparing said D.C. voltage with a precision D.C. reference voltage, said operational rectifier means comprising a high gain amplifier having a pair of feedback loops adapted respectively to conduct on opposite polarities of said A.C. signal, each of said feedback loops including a respective pair of appropriately poled series diodes and a series associated resistor, means resistively connecting each junction between the diodes of each pair to ground, and means coupling the input of said comparator means to a point in one of said feedback loops intermediate its resistor and diode pair.

3. A device for monitoring an A.C. voltage signal, said device comprising in combination, operational rectifier means for converting said A.C. voltage to a D.C. voltage, and comparator means for comparing said D.C. voltage with a precision D.C. reference voltage, said operational rectifier means comprising a high gain amplifier having a pair of feedback loops between the input and output of said amplifier and adapted respectively to conduct on opposite polarities of said A.C. signal, each of said feedback loops including a respective pair of appropriately poled series diodes, means resistively connecting the diode-to-diode junction of each pair to ground, at least one of said loops also including a resistive impedance in series with the respective pair of said diodes and disposed in circuit between one of the respective pair of diodes of said one loop and the amplifier input, and terminal means located in circuit between said resistive impedance and said one of said diodes, said terminal means being connected to an input of said comparator means.

4. A device for monitoring an A.C. voltage signal, said device comprising in combination, operational rectifier means for converting said A.C. voltage to a D.C. voltage, and comparator means for comparing said D.C. voltage with a precision D.C. reference voltage, said operational rectifier means comprising a high gain amplifier having a degenerative feedback loop including in series a pair of diodes and a resistance between the output and input of said amplifier, means resistively connecting the junction of said diodes to ground, and means for resistively coupling the input of said comparator means to a point in said feedback loop intermediate said resistance and said diodes, said comparator means comprising a second high gain inverting amplifier having a filtering feedback loop including a capacitive impedance, in parallel with a resistive impedance, said filtering feedback loop being adapted to provide a virtual ground at the input of said second amplifier.

5. A device for monitoring an A.C. voltage signal, said device comprising in combination, operational rectifier means for converting said A.C. voltage to a D.C. voltage, and comparator means for comparing said D.C. voltage with a precision D.C. reference voltage, said operational rectifier means comprising a high gain amplifier having a degenerative feedback loop including in series a pair of diodes and a resistance between the output and input of said amplifier, means resistively connecting the junction of said diodes to ground, and means for resistively coupling the input of said comparator means to a point in said feedback loop intermediate said resistance and said diodes, said comparator means comprising a second high gain inverting amplifier having a summing junction at its input, means for adding said reference voltage at said junction, and a filtering feedback loop between the output of said second amplifier and said summing junction, the last named feedback loop including resistive and capacitive impedances and providing a virtual ground at said summing junction.

6. An operational rectifier device for precision conversion of an A.C. voltage signal into a D.C. voltage comprising the combination of a high gain inverting amplifier having an input terminal and an output terminal; a summing junction directly connected to said amplifier input terminal; an A.C. input terminal; an input resistor connected between said A.C. input terminal and said summing junction; a first feedback circuit connected between said amplifier output terminal and said summing junction, said first feedback circuit comprising two semiconductor diodes and a resistor connected in series circuit relationship; a second feedback circuit connected in parallel with said first feedback circuit, said second feedback circuit comprising two semiconductor diodes and a resistor connected in series circuit relationship; said diodes being connected adjacent to each other and said feedback circuit resistor being connected adjacent said summing junction; means resistively connecting a point between said diodes to a point of reference potential; and an operational rectifier output terminal connected to a point in one of said feedback circuits between said diodes and said feedback circuit resistor.

References Cited by the Examiner

UNITED STATES PATENTS

| | | | |
|---|---|---|---|
| 2,985,775 | 5/1961 | Sollecito | 307—88.5 |
| 3,112,449 | 11/1963 | Miller | 307—88.5 |
| 3,166,720 | 1/1965 | Rosen et al. | 307—88.5 |
| 3,196,291 | 7/1965 | Woodward | 307—88.5 |
| 3,252,105 | 5/1966 | Patchell | 307—88.5 |

ARTHUR GAUSS, *Primary Examiner.*

J. JORDAN, *Assistant Examiner.*

Disclaimer and Dedication

3,311,835.—*Peter L. Richman*, Lexington, Mass. OPERATIONAL RECTI-
FIER. Patent dated Mar. 28, 1967. Disclaimer and dedication filed
Mar. 17, 1971, by the assignee, *Weston Instruments, Inc.*

Hereby enters this disclaimer to the remaining term of said patent and dedicates said patent to the Public.

[*Official Gazette April 27, 1971.*]